United States Patent Office 3,133,348
Patented May 19, 1964

3,133,348
METHOD OF WELDING OR BRAZING
Arthur T. Cape, Monterey, Calif., assignor to Coast Metals, Inc., Little Ferry, N.J., a corporation of Delaware
No Drawing. Filed Nov. 21, 1961, Ser. No. 154,033
1 Claim. (Cl. 29—494)

This invention relates generally to a method of welding or brazing, but has reference more particularly to improvements in the method disclosed in Jordan Patent No. 2,576,793.

In Jordan Patent No. 2,576,793, there is disclosed a process in which an inert gas such as argon, is passed through liquid carbon tetrachloride to convert the liquid tetrachloride into a gas which is directed at a welding area, in order to protect the welding operation against the action of air, and to remove oxides from the surfaces being welded.

The inert gas is usually passed through the liquid tetrachloride at room temperature or higher temperatures, with the result that excessive quantities of the tetrachloride are picked up by the inert gas, and when the gas is carried to the welding area, the excess tetrachloride decomposes to form deposits of carbon which are injurious to the welding operation.

I have found that if the inert gas is passed through the liquid carbon tetrachloride at a temperature within the range of from about +10° C. down to about —30° C., the amount of carbon tetrachloride picked up is just sufficient to be effective in eliminating oxides from the surfaces being welded, but not sufficient to provide the excess to which reference has been made, and which is injurious to and interferes with proper brazing.

The process of the present invention is adaptable, in particular, to the brazing of aluminum, but may be used with good effect in the brazing of other metals, such as titanium, stainless steel, molybdenum, brass and bronze.

Inert gases which may be employed in the process are argon, helium, nitrogen, etc., or mixtures of these.

Having thus described my invention, I claim:

In the brazing or welding of metals, the steps which comprise passing an inert gas through liquid carbon tetrachloride which is at a temperature within the range of from about +10° C. to about —30° C., whereby to entrain carbon tetrachloride in the gas in a quantity sufficient to be effective in eliminating oxides from the surfaces being welded or brazed, but insufficient to provide an excess decomposable to form deposits of carbon during the brazing or welding, then passing the gas to the area to be welded or brazed, and welding or brazing the metals in the presence of said gas.

References Cited in the file of this patent
UNITED STATES PATENTS 2,576,793     Jordan     Nov. 27, 1951
2,768,278     Gaines     Oct. 23, 1956